Sept. 8, 1959 R. M. REICHL 2,903,130
METHOD OF EXTRUDING TUBES
Filed Nov. 19, 1954 4 Sheets-Sheet 1
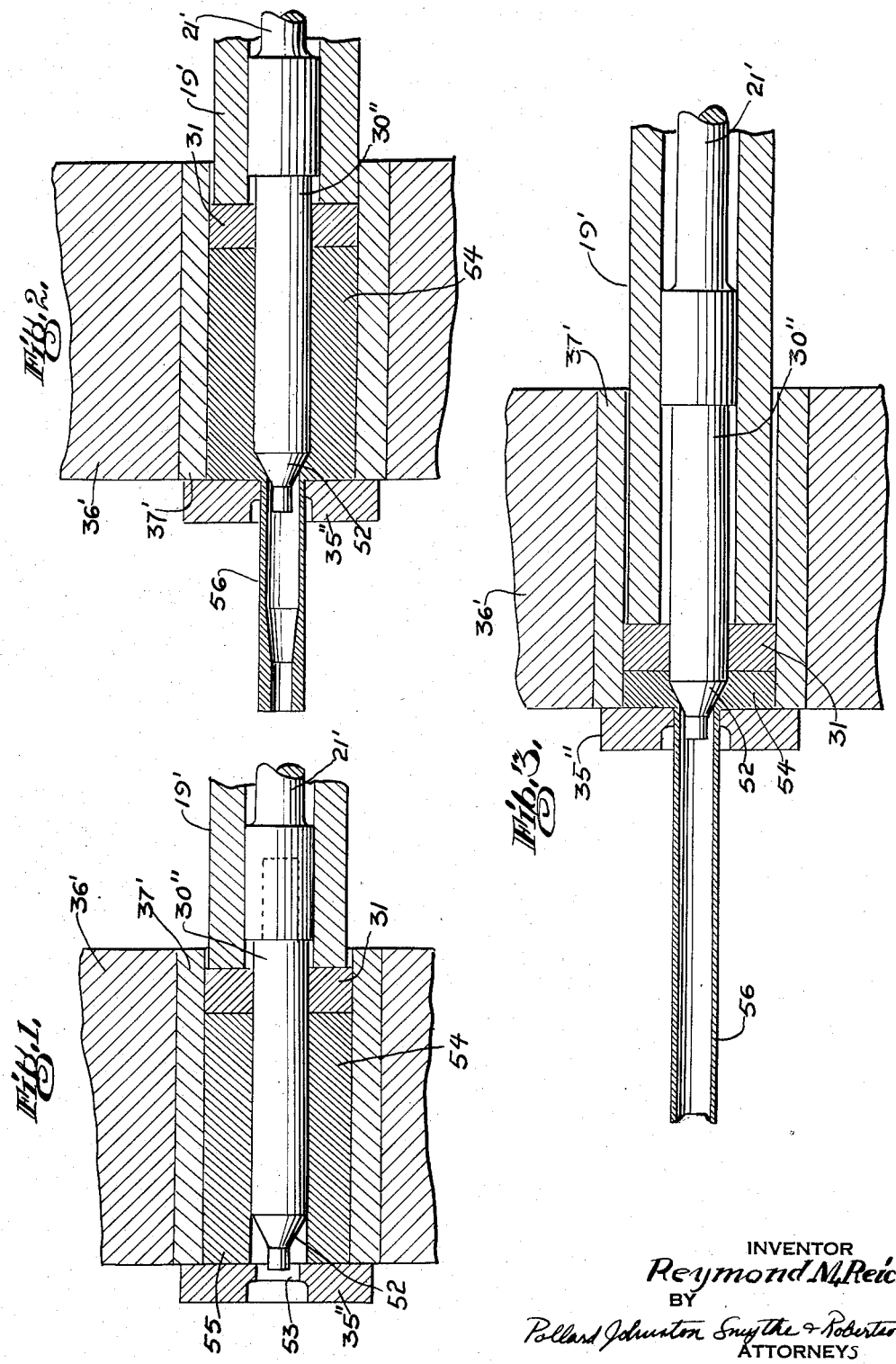
INVENTOR
Reymond M. Reichl
BY
Pollard Johnston Smythe & Robertson
ATTORNEYS

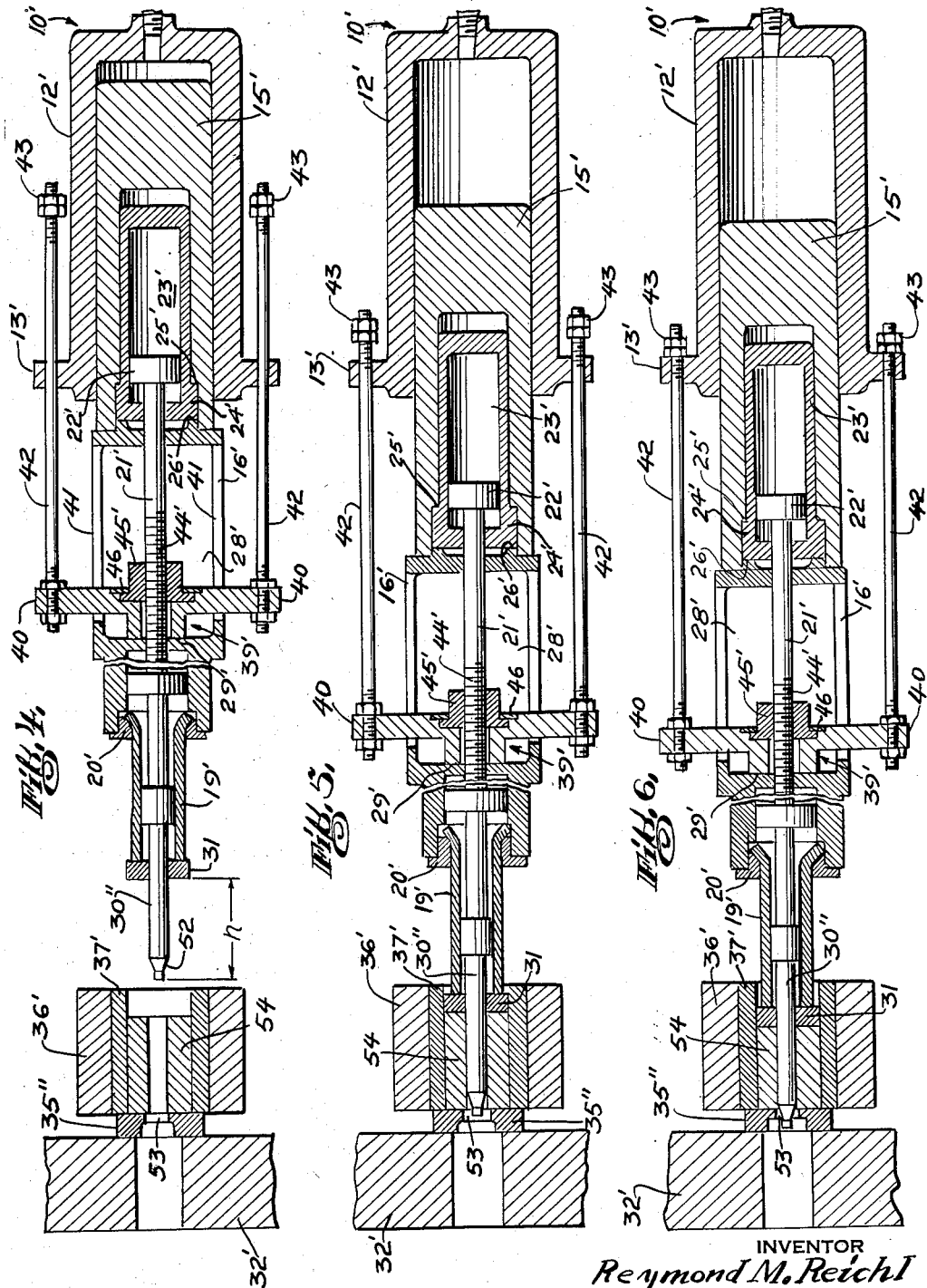

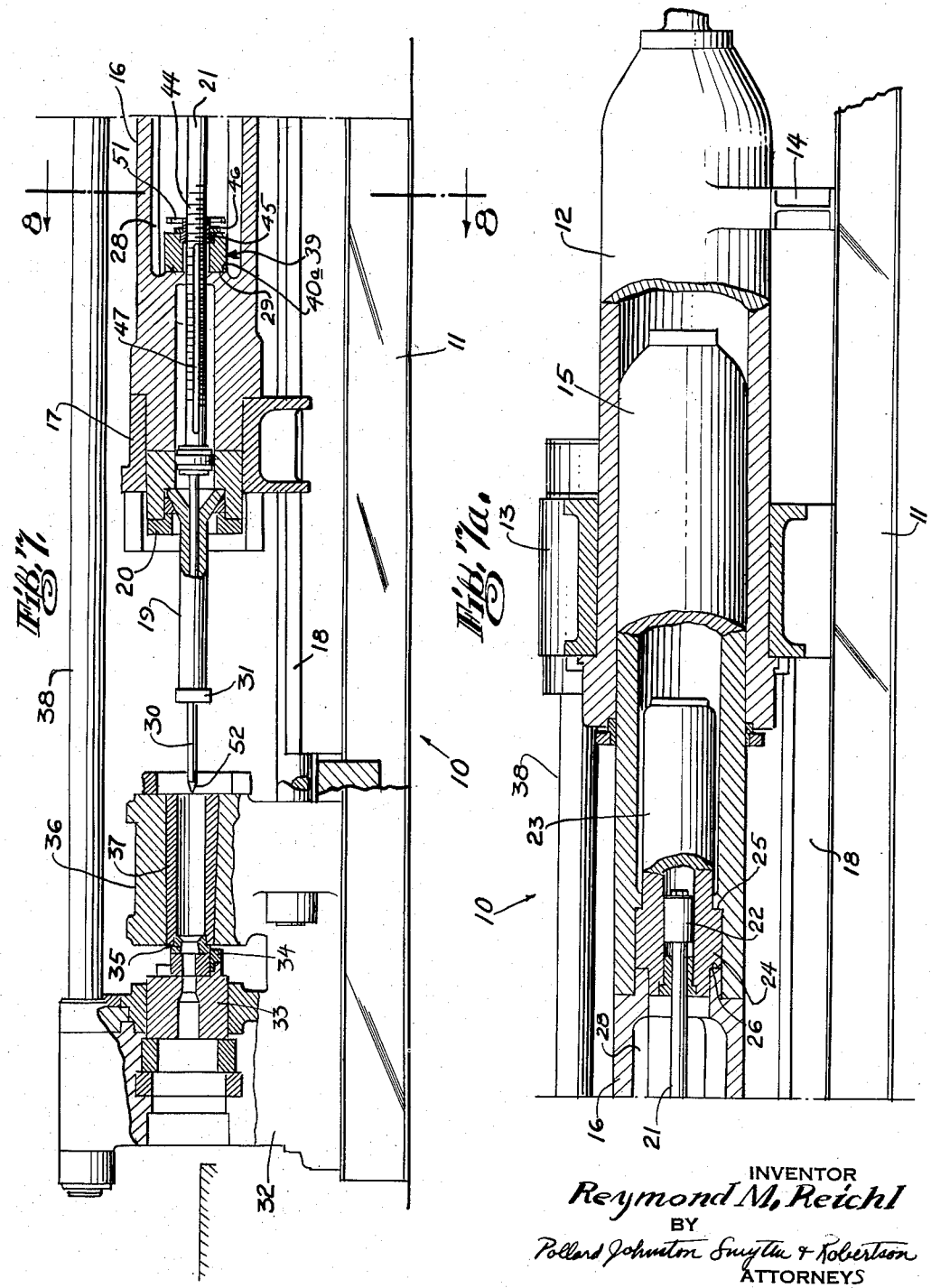

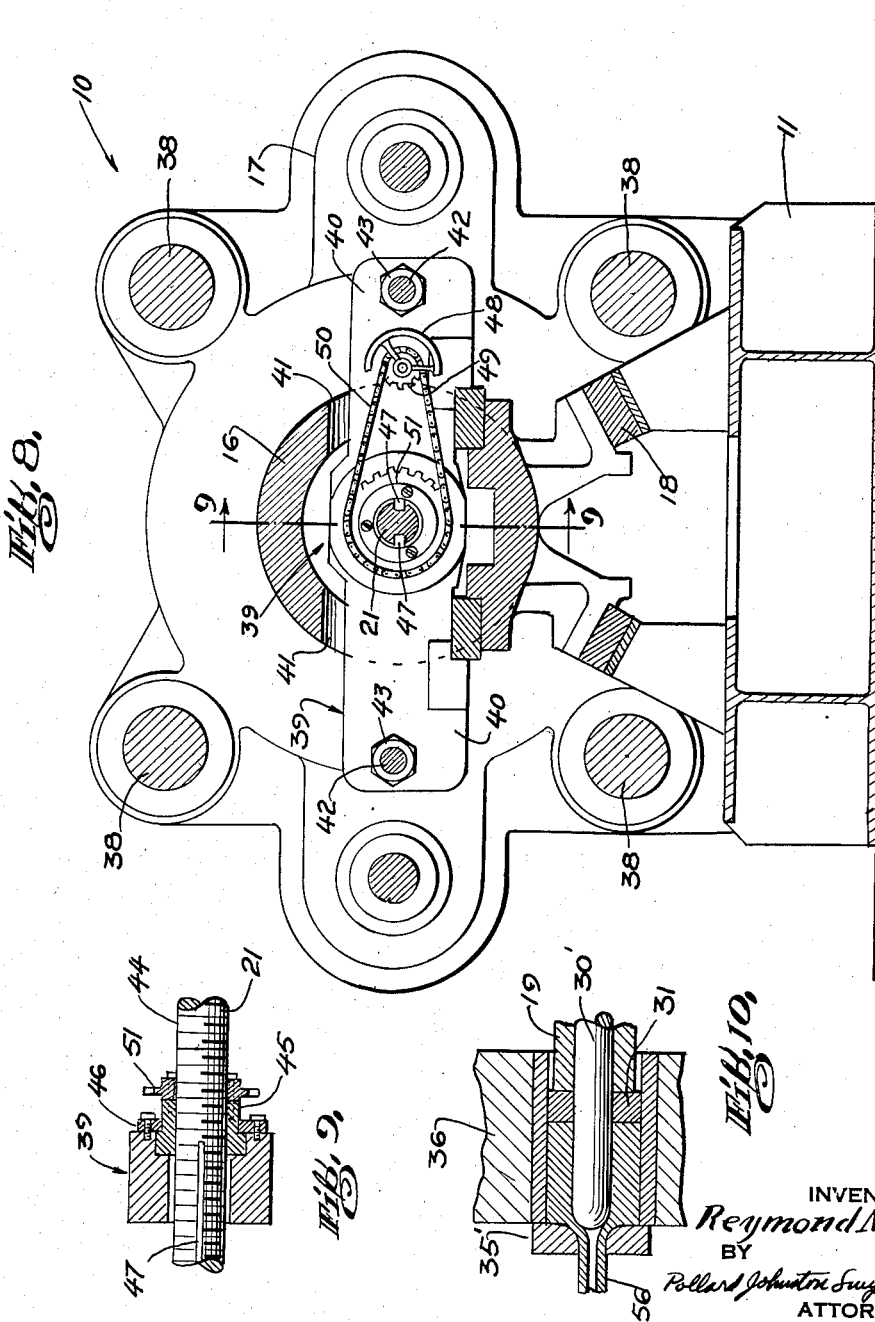

United States Patent Office 2,903,130
Patented Sept. 8, 1959

2,903,130

METHOD OF EXTRUDING TUBES

Reymond M. Reichl, Forest Hills, N.Y., assignor, by mesne assignments, to Baldwin-Lima-Hamilton Corporation, Philadelphia, Pa., a corporation of Pennsylvania Application November 19, 1954, Serial No. 469,872

1 Claim. (Cl. 207—10)

This invention relates generally to extrusion presses, and is particularly directed to extrusion presses of the type used in forming tubes and other hollow bodies.

Extrusion presses of the type referred to above usually includes a billet container positioned in front of the die and into which a billet is placed, a reciprocable extrusion stem engaging a dummy block, and a mandrel extending axially through the stem. The mandrel is projected from the stem to be extended through a hollow billet in the container, or to pierce a solid billet, and then defines an annular space between the die opening and the mandrel through which the metal of the billet is extruded by movement of the extrusion stem into the billet container. The thickness of the wall of the hollow body or tube which is thereby extruded is determined by the distance across the annular space defined between the mandrel and die opening. Accordingly, the size of the bore or opening extending through the extruded hollow body is determined by the cross-sectional area of the portion of the mandrel cooperating with the die opening to define said annular space.

The extrusion of tubes or hollow bodies having thin walls and/or axial openings or bores of small cross-sectional area is attended by several difficulties. If a mandrel is employed having a cross-sectional area throughout its length corresponding to that of the opening of the tube or hollow body to be extruded, the mandrel may either "neck" under the tension resulting from the flow of billet material around the mandrel, or be torn off completely by this tension. This possibility of failure of the mandrel is accentuated when hollow metal bodies having small openings are extruded at high temperatures, since the ratio of surface area to cross-sectional area is relatively high in a mandrel of small cross-section and such a mandrel absorbs heat from a billet faster than a mandrel of relatively large cross-section so that the strength of the mandrel is appreciably reduced. Accordingly, it has been previously proposed to employ a mandrel having a tapered tip to cooperate with the die opening so that the cross-section of the mandrel at the portion thereof defining the annular space through which the metal is extruded can be relatively small while the remainder of the mandrel is of relatively large cross-section to provide the requisite strength and to rapidly conduct heat from the tip.

Further, in extruding tubes or hollow bodies of metal at elevated temperatures, it is necessary that the flow of metal through the space between the die opening and mandrel be established as rapidly as possible, as any appreciable delay in the starting of such flow permits cooling of the billet at the edge of the latter adjacent the die and mandrel, and even a slight cooling of the billet at that location may result in "freezing" of the metal which prevents start of the extrusion of the latter. However, once flow of the metal through the annular space between the die opening and mandrel has been established, such flow will be continued by the extrusion pressure even though the temperature of the billet falls below that at which the above mentioned "freezing" of the metal occurs. It is apparent that the resistance to the initial establishment of the flow of metal through the space defined between the die opening and mandrel is relatively high when the thin walled tubes or bodies are being extruded and the distance across said space is correspondingly small, so that the tendency to "freezing" of the metal in the heated billet is relatively great. In order to avoid this possibility, it has been proposed that the initial extrusion take place with a relatively wide space between the mandrel and die opening to facilitate the establishment of the flow through said space, after which the space is narrowed to correspond to the thickness of the thin walled tube or body being extruded.

When a tapered tip has been used heretofore in an extrusion press to permit extrusion of a tube or body having a bore or axial opening of a small cross-section, the mandrel has been held in fixed position relative to the die so that the extrusion of a thin walled tube or hollow body has encountered the above mentioned difficulty in establishing the initial flow of metal through the space between the die opening and mandrel tip. On the other hand, the existing extrusion presses which seek to avoid the difficulty experienced in establishing initial flow of the metal during extrusion of thin walled tubes or hollow bodies, by starting with a relatively wide space between the die opening and mandrel which is narrowed to correspond to the thin wall of the extruded tube or hollow body only after the metal flow is established, employ a mandrel which is fixed relative to the extrusion stem and moves with the stem through the die opening a substantial distance. In such an existing press, the cross-section of the mandrel throughout most of its length must correspond to that of the bore or axial opening of the tube or hollow body being extruded and a weak and easily destroyed mandrel results when the extruded body is to have an axial opening of small cross-section. Also, withdrawal of the mandrel which in this arrangement projects into the extruded tube a substantial distance is difficult. If the mandrel is made conical over its effective length to facilitate withdrawal, there will be a resultant variation in wall thickness throughout the entire length of the tube.

Accordingly, it is an object of this invention to provide an extrusion press capable of extruding thin walled tubes or hollow bodies having axial openings or bores of small cross-section while avoiding or overcoming the above described difficulties which have previously attended the extrusion of such tubes or hollow bodies.

A further object of the invention is to provide an arrangement wherein the mandrel moves with the stem in an adjusted relative position and thereafter is held in an adjusted position relative to the die.

In accordance with an aspect of this invention, a mandrel having a tapered or other suitably shaped tip is positioned, at the start of the operative stroke of the extrusion stem, so that a relatively wide space is defined between the die opening and the mandrel tip for facilitating the establishment of metal flow through the wide space, the mandrel being initially moved with the extrusion stem relative to the die thereby to gradually narrow the space defined between the die opening and tapered mandrel tip and then stopped, so that, after the flow of metal has been established, the distance across said space corresponds to the thickness of the wall of the tube or hollow body to be extruded and further movement of the mandrel with the extrusion stem and relative to the die is then prevented.

A further feature of the invention resides in the provision of mechanisms for conveniently adjusting the position which the mandrel will assume with respect to the die at the instant when the extrusion stem, or the dummy block carried by the latter, comes into contact with the billet in the container to begin extrusion of the billet so that the width of the space between the die opening and mandrel tip at the commencement of extrusion can be varied, and for adjusting the limit of the movement of the mandrel with the extrusion stem and relative to the die so that the final width of the space between the die opening and mandrel tip, which final width determines the wall thickness of the extruded tube or hollow body, can also be varied.

The above, and other objects, features and advantages of the invention, will be apparent in the following detailed description of an illustrative embodiment thereof, particularly when said description is read in connection with the accompanying drawings forming a part hereof, and wherein:

Fig. 1 is a fragmentary sectional view showing the relative positions of the die, mandrel and extrusion stem in an extrusion press embodying the present invention and at the beginning of the extruding portion of the operating stroke of the stem;

Fig. 2 is a view similar to Fig. 1, but showing the relative positions of the illustrated parts of the press at a later stage during the extruding portion of the operating stroke of the stem;

Fig. 3 is another view similar to Fig. 1, but showing the relative positions of the illustrated parts at the conclusion of the operating stroke of the extrusion stem;

Fig. 4 is a diagrammatic, sectional view along the longitudinal axis of an extrusion press embodying the invention, with the parts of the press in the positions occupied thereby prior to the operating stroke of the extrusion stem;

Fig. 5 is a view similar to Fig. 4, but with the parts thereof in positions corresponding to the condition illustrated in Fig. 1;

Fig. 6 is a view similar to Fig. 4, but with the parts thereof in positions corresponding to the condition illustrated in Fig. 2;

Figs. 7 and 7a combined show a side elevational view, partly broken away and in section, of a modified structural embodiment of the invention;

Fig. 8 is a transverse sectional view taken along the line 8—8 of Fig. 7, but on an enlarged scale;

Fig. 9 is a fragmentary, sectional view taken along the line 9—9 of Fig. 8; and

Fig. 10 is a fragmentary, diagrammatic view similar to Fig. 2, but illustrating the operation of a modified press for extruding a relatively thick walled tube or hollow body with a very small axial bore.

The modified structure shown in Figs. 7 and 7a is the same in operation as that disclosed in Figs. 4, 5 and 6 and similar reference numerals are used throughout the specification to describe similar elements.

Referring to the drawings in detail, and initially to Figs. 7, 7a and 8 thereof, a horizontal extrusion press embodying the invention is illustrated and generally identified by the reference numeral 10. Extrusion press 10 includes a bed or frame 11 having a main cylinder 12 mounted in fixed supports 13 and 14 adjacent one end of the bed. Main cylinder 12 accommodates a main ram 15 from which a distance piece 16 extends, with the end of the latter remote from the main ram being carried by a movable crosshead or cradle 17 which is slidable on suitable guides 18 on the bed. A hollow extrusion stem 19 is secured to distance piece 16 by a suitable clamp 20, and a mandrel holder 21 extends through the distance piece and is attached to a mandrel moving ram 22 which moves within a mandrel moving cylinder 23. The mandrel moving cylinder is secured to and carried by main ram 15, as by flange 24 of the mandrel moving cylinder being locked between a flange 25 of the main ram and an end face 26 of the distance piece 16. Where appropriate, similar numerals bearing prime and double prime marks designate similar parts in Figs. 1–6 inclusive.

The mandrel holder 21 carries an adjustable nut 45 which is carried by a crosshead 39 reciprocable with the mandrel holder 21 within an enlarged bore 28 of the distance piece 16, said crosshead having a face 40a engageable with an inwardly directed flange 29 which defines one end of the bore 28 to limit the stroke of the mandrel holder 21 and the mandrel moving ram 22 relative to the extrusion stem. Mandrel holder 21 has a mandrel 30 secured thereto which extends through extrusion stem 19 and the conventional dummy block 31 which is mounted at the free end of the extrusion stem.

Extrusion press 10 further includes a fixed platen 32 at the end of bed 11 remote from main cylinder 12. Platen 32 supports a die carrier 33 having a die holder and bolster arrangement 34 thereon for mounting a die 35 in axial alignment with extrusion stem 19 and mandrel 30. A billet container 36 is mounted on bed 11 in front of die 35 and has a liner 37 therein to receive a pierced or solid billet. Suitable tie-rods 38 extend between platen 32 and the support or crosshead 13 for the main cylinder 12.

It is apparent that the operating or extrusion stroke of extrusion stem 19 can be effected by admitting fluid under pressure into main cylinder 12 to act against main ram 15, while the return stroke of the extrusion stem is effected by admitting fluid under pressure to the usual return cylinder assemblies (not shown). On the other hand, extension and retraction of the mandrel 30 with respect to extrusion stem 19 and dummy block 31 is effected by admitting fluid under pressure to mandrel moving cylinder 23, at one side or the other of the ram 22 within that cylinder.

In accordance with the present invention, the crosshead 39 is associated with mandrel holder 21 within the distance piece 16 and is provided with laterally extending arms 40 which pass through elongated openings 41 in the sides of the distance piece. As mentioned, cross-head 39 is engageable with flange 29 within distance piece 16 to limit the extension of the mandrel 30 from the extrusion stem 19, and drag rods 42 (Fig. 8) extend from the arms 40 of cross-head 39 and pass slidably through the crosshead or support 13 of the main cylinder 12, as shown diagrammatically on Figs. 4, 5 and 6, so that nuts 43 threaded on the end portions of the drag rods are engageable against cross-head 13, as shown in Fig. 6, to limit the movement of the mandrel holder 21 in the direction toward fixed platen 32.

It is apparent that the nuts 43, being threaded on drag rods 42, permit adjustment of the limit of movement of mandrel holder 21 relative to fixed platen 32 in the direction toward the latter. In accordance with the invention, cross-head 39 is also adjustable along mandrel holder 21 thereby to permit variation of the maximum extension of the mandrel 30 from the extension stem as determined by engagement of cross-head 39 against flange 29 of distance piece 16.

In order to provide for adjustment of cross-head 39 along mandrel holder 21, the latter is preferably formed with threads 44 along a portion thereof to receive the rotatable nut member 45 which is axially coupled to cross-head 39 and forms the connection between the latter and the mandrel holder. As seen in detail in Fig. 9, the axial coupling of nut member 45 to cross-head 39 may be achieved by forming the cross-head with an annular recess in the end face thereof for rotatably accommodating an enlarged diameter portion of nut member 45, with a retaining ring 46 being secured to the end face of cross-head 39 and radially overlapping the enlarged diameter portion of the nut member to prevent axial separation of the latter from the cross-head while permitting rotation of nut member 45 with respect to mandrel holder 21. Rotation of the mandrel holder is prevented, for example, by fixed pins or keys (not shown) engaging in axial slots 47 formed in the mandrel holder.

Thus, rotation of nut member 45 will effect axial movement of the latter and of the cross-head 39 with respect to mandrel holder 21 thereby to vary the position of the mandrel holder 21 and mandrel 30 with respect to extrusion stem 19 when limiting contact is established between cross-head 39 and flange 29. In the constructional embodiment of the invention illustrated in Figs. 7, 7a, 8 and 9, rotation of nut member 45 for effecting the above described adjustment is achieved by a handwheel 48 (Fig. 8) which is rotatably mounted on one of the arms 40 of the cross-head 39 at a location outside of distance piece 16, the handwheel 48 driving a sprocket 49 which is coaxial therewith. An endless chain 50 runs around sprocket 49 and a sprocket 51 which is suitably secured to nut member 45. While a particular mechanism has been illustrated and described above to rotate the nut member 45, it is to be understood that other suitable mechanisms may be used for the stated purpose.

Figs. 1 to 6 have the same reference numerals, with the addition of prime and double prime marks where appropriate, to identify parts corresponding to the parts shown in the Figs. 7 to 9 modification.

As seen in the drawings, and particularly in the enlarged fragmentary views of Figs. 1, 2 and 3, the mandrel 30" is provided with a tapered tip 52 so that the distance across the space defined between the opening 53 of die 35" and tip 52 will be varied as the mandrel 30" is axially displaced from the position shown in Fig. 1 to the position shown in Figs. 2 and 3. Thus, by commencing extrusion of a billet 54 in container 36' with the mandrel located as in Fig. 1, the resistance to flow of the metal of billet 54 through the relatively wide space or orifice between opening 53 and tip 52 is correspondingly low thereby ensuring that the flow of metal will be established before the heated billet has cooled, particularly at the corner 55 thereof, to a degree causing "freezing" of the metal. Once the flow of metal has been established through the die opening and around the mandrel tip, the mandrel can be axially displaced to the position shown in Figs. 2 and 3, thereby gradually narrowing the orifice or space through which the metal is extruded until the distance across said space corresponds to the thickness of the wall of the tube or hollow body 56 to be extruded. Since the flow of metal is started before narrowing of the space through which the metal is extruded, it is apparent that the final distance across that space can be very small to permit extrusion of tubes or hollow bodies having thin walls. Further, as seen in Figs. 2 and 3, the portion of the mandrel tip 52 cooperating with opening 53, to define the space through which metal is extruded, is intermediate the ends of the tip so that the area of that portion of the mandrel tip, which corresponds to the cross-section of the axial opening or bore of the extruded hollow body, may be relatively small to provide an extruded hollow body having a small internal bore or opening, while the main portion of the mandrel is of relatively large cross-section to be able to withstand the high tension stresses resulting from the extrusion of the metal there-around without "necking" and to ensure adequate conduction of heat from the tip so that the strength of the mandrel is not appreciably decreased by the heat from the billet. The mandrel 30" with a tapered tip 52 has an additional advantage in that, when extruding tubes or hollow bodies of irregular or non-circular cross-section, only the tip portion of the mandrel need be machined or otherwise formed with a corresponding irregular or non-circular cross-section, while the remainder of the mandrel can be circular or have whatever other configuration is most convenient or economical.

The operation of an extrusion press embodying the present invention will now be described with reference to Figs. 4, 5 and 6, which diagrammatically show the relative positions of the various parts of the press during different phases of the extrusion of a tube or hollow body, such parts being identified by similar numerals as the corresponding parts of the press 10 described in connection with Figs. 7, 7a, 8 and 9.

At the beginning of the extrusion stroke (Fig. 4), fluid under pressure is admitted to mandrel moving cylinder 23' to the right of ram 22', as viewed in Fig. 4, thereby displacing ram 22', mandrel holder 21' and mandrel 30" to the left with respect to extrusion stem 19' until cross-head 39' contacts flange 29' of distance piece 16' and definitely limits the extension of mandrel 30" from the extrusion stem.

With mandrel 30" held in fixed, extended relation to extrusion stem 19' by the continued action of the pressure fluid in cylinder 23' against ram 22', fluid under pressure is admitted to main cylinder 12' and there acts against main ram 15' to displace the latter and distance piece 16' and extrusion stem 19' to the left, as viewed in Fig. 5. The distance $n$ (Fig. 4) that the mandrel 30" extends beyond the dummy block 31 is determined by the adjusted location of cross-head 39' on the mandrel holder, and the distance $n$ is set so that, when the dummy block 31 first contacts billet 54 in container 36' (Figs. 1 and 5) the orifice or space defined between mandrel tip 52 and die opening 53 is relatively wide to facilitate the start of the flow of the metal through that orifice. As seen in Fig. 5, when the dummy block first contacts the billet 54 during the extrusion stroke, the stop nuts 43 on drag rods 42 are still spaced from the support or cross-head 13' of the main cylinder so that, during the initial extrusion of the billet, the mandrel 30", holder 21', cross-head 39' and drag rods 42 can continue to move with the extrusion stem 19' thereby to gradually narrow the orifice or space between the die opening and mandrel tip until the stop nuts 43 contact the fixed cross-head or support 13' (Fig. 6) and establish the final position of the mandrel tip relative to the die (Fig. 2). After the stop nuts 43 engage support 13', the extrusion stem 19' moves relative to the mandrel 30" (Fig. 3) to continue the extrusion of the tube or hollow body 56. It is apparent that following the engagement of stop nuts 43 with support 13', and during the extrusion of the tube or hollow body 56, the thickness of the wall of the extruded tube or body can be varied by adjustment of the nut member 45' along mandrel holder 21', for example, through manipulation of handwheel 48 in the embodiment of Figs. 7, 7a, 8 and 9, such adjustment of nut member 45', which forms the connection between cross-head 39' and mandrel holder 21', serving to vary the final position of mandrel tip 52 relative to die 35" as determined by the contact of stop nuts 43 with cross-head or support 13'. Thus, in an extrusion press embodying the present invention, the wall thickness of the extruded tube or hollow body can be adjusted during the extrusion operation to permit compensation for deflections of the press or other error producing factors which might otherwise result in an unacceptable extrusion by reason of the wall thickness thereof being either greater or less than the established tolerances therefor.

From the foregoing, it is apparent that an extrusion press embodying this invention is capable of extruding tubes or hollow bodies having thin walls and/or relatively small axial openings or bores while avoiding or overcoming the above described difficulties previously experienced in the extrusion of such tubes or hollow bodies. It will be clear that the described extrusion press is not limited in its use to the extrusion of thin walled, small bore tubes or hollow bodies. For example, as shown in Fig. 10, hollow bodies having relatively thick walls and very small axial bores, such as, hollow stay bolts, can be extruded with the die opening defining the external configuration of the extruded body 56 while the wall thickness is determined by adjustment of the position of mandrel 30' relative to die 35', in the manner described above, so that the size of the bore or opening of the body 56 is established by the flow along the tip of the mandrel and can be much smaller than the cross-section of the main portion of mandrel 30'.

Further, the described embodiment of the invention can be operated in the same manner as existing presses, that is, with the mandrel 30 and 30' moving with the extrusion stem 19 during the entire extrusion stroke, for example, when a tube or hollow body having a bore or axial opening of large cross-section is to be extruded, and such operation of the extrusion press is made possible merely by removing stop nuts 43 from the drag rods 42 or by disconnecting the drag rods from the cross-head 39.

While a particular embodiment of the invention has been described in detail and illustrated in the accompanying drawings, it is to be understood that the invention is not limited to that precise embodiment, and that various changes and modifications may be effected therein without departing from the scope or spirit of the invention as defined in the appended claim. For example, the invention is applicable not only to presses having a mandrel moving cylinder within the main ram as shown, but also to presses of the type having an independent piercing cylinder arranged in tandem with the main cylinder, the mandrel being actuated through the hollow main ram. In the latter case, the piercing ram will likewise urge the mandrel assembly against an abutment face associated with the stem so that the mandrel will initially move with the stem in an adjusted relative position and thereafter, the mandrel will be held by stop means in a predetermined position relative to the die during the remainder of the extrusion operation.

What is claimed is:

A method for extruding thin walled tubing of a predetermined wall thickness through a die opening comprising the steps of starting the extrusion operation around a tapered tip mandrel in a first position relative to said die opening to extrude a tube having a wall thickness greater than said predetermined thickness to establish flow of metal, and then continuing and completing the extrusion operation around said tapered tip mandrel when it is in a second, stationary inner position with its tapered portion cooperating with said die opening to extrude a tube having said predetermined wall thickness.

References Cited in the file of this patent

UNITED STATES PATENTS

| | | |
|---|---|---|
| 399,291 | Siemens | Mar. 12, 1889 |
| 924,005 | Schwieger | June 8, 1909 |
| 1,084,881 | Gahlen | Jan. 20, 1914 |
| 1,854,411 | Leighton | Apr. 19, 1932 |
| 2,142,704 | Sparks | Jan. 3, 1939 |
| 2,732,066 | Albers | Jan. 24, 1956 |

FOREIGN PATENTS

| | | |
|---|---|---|
| 233,891 | Germany | Apr. 26, 1911 |
| 599,555 | Germany | July 4, 1934 |